US009104873B1

(12) United States Patent
Chen et al.

(10) Patent No.: US 9,104,873 B1
(45) Date of Patent: Aug. 11, 2015

(54) SYSTEMS AND METHODS FOR DETERMINING WHETHER GRAPHICS PROCESSING UNITS ARE EXECUTING POTENTIALLY MALICIOUS PROCESSES

(75) Inventors: Joseph Chen, Los Angeles, CA (US); Brendon Woirhaye, North Whittier, CA (US)

(73) Assignee: Symantec Corporation, Mountain View, CA (US)

( * ) Notice: Subject to any disclaimer, the term of this patent is extended or adjusted under 35 U.S.C. 154(b) by 545 days.

(21) Appl. No.: 13/476,508

(22) Filed: May 21, 2012

(51) Int. Cl.
*G06F 21/62* (2013.01)
*G06F 21/56* (2013.01)
*G06F 21/54* (2013.01)
*G06F 21/55* (2013.01)
*G06F 11/34* (2006.01)
*G06F 11/36* (2006.01)

(52) U.S. Cl.
CPC .......... *G06F 21/566* (2013.01); *G06F 11/3466* (2013.01); *G06F 11/3612* (2013.01); *G06F 21/54* (2013.01); *G06F 21/554* (2013.01); *G06F 11/3616* (2013.01)

(58) Field of Classification Search
CPC ......... G06F 21/56; G06F 11/36; G06F 11/34; G06F 21/54; H04L 63/14
USPC ............................................. 726/24; 713/175
See application file for complete search history.

(56) References Cited

U.S. PATENT DOCUMENTS

2008/0307526 A1* 12/2008 Chung et al. .................... 726/23
2011/0145926 A1* 6/2011 Dalcher et al. .................. 726/26
2012/0075314 A1* 3/2012 Malakapalli et al. .......... 345/522
2012/0081377 A1* 4/2012 Sowerby et al. ............... 345/522
2013/0227521 A1* 8/2013 Bourd et al. ................... 717/110

OTHER PUBLICATIONS

Nash et al., Towards an Intrusion Dtection System for Battery Exhaustion Attacks on Mobile Computing Devices, 2005, Published by IEEE Press, Proceedings of the 3rd Int'l Conf. on Pervasive Computing and Communications Workshops, p. 1-5.*
Nash et al., Towards an Intrusion Dtection System for Battery Exhaustion Attacks on Mobile Computing Devices, 2005, IEEE Press, Proceedings of the 3rd Int'l Conf. on Pervasive Computing and Communications Workshops, p. 1-5.*
Jason Mick, GPU Roaring? You May Be Infected With a Bitcoin Trojan Says Symantec, Aug. 17, 2011, Dailytech, http://www.dailytech.com/GPU+Roaring++You+May+Be+Infected+With+a+Bitcoin+Trojan+Says+Symantec/article22474.htm, p. 1-2.*
Symantec Corp., Software White-Listing Request, Feb. 3, 2010, https://submit.symantic.com/whitelist, p. 1.*
AnandTechForums, Jan. 22, 2011, http://forums.anandtech.com/showthread.php?t=2137513, p. 1.*

* cited by examiner

*Primary Examiner* — Joseph P Hirl
*Assistant Examiner* — Stephen Gundry
(74) *Attorney, Agent, or Firm* — ALG Intellectual Property, LLC (57) ABSTRACT

A computer-implemented method for determining whether GPUs are executing potentially malicious processes may include (1) identifying at least one GPU associated with a computing device, (2) analyzing the behavior of the GPU associated with the computing device, (3) determining that the analyzed behavior of the GPU indicates that the GPU is executing at least one potentially malicious process, and then (4) performing at least one security action on the GPU in response to determining that the analyzed behavior indicates that the GPU is executing the potentially malicious process. Various other methods, systems, and computer-readable media are also disclosed.

14 Claims, 6 Drawing Sheets

Graphics Processing Unit Information
400

GPU Processing Power Usage:        99%

GPU Electrical Power Consumption:  300W

GPU Temperature:                   85 °C

Process(es) Running on the GPU:    Suspicious.exe

Central Processing Unit Information
402

CPU Processing Power Usage:        3%

CPU Electrical Power Consumption:  2W

CPU Temperature:                   35 °C

Process(es) Running on the CPU:    Browser.exe
                                   EmailClient.exe
                                   MediaPlayer.exe
                                   Spreadsheet.exe

SYSTEMS AND METHODS FOR DETERMINING WHETHER GRAPHICS PROCESSING UNITS ARE EXECUTING POTENTIALLY MALICIOUS PROCESSES

BACKGROUND

Malware authors often look for new ways to introduce malware into computing devices without detection. In an attempt to avoid detection, some malware authors may design malware that utilizes computing components that are not typically monitored by traditional anti-malware solutions. For example, a malware author may develop and distribute malicious bots designed to run on a computing device's graphics processing unit (GPU), rather than on the computing device's central processing unit (CPU). These bots may infiltrate a variety of computing devices and leverage the processing power of the devices' GPUs to form a large-scale botnet controlled by the malware author. Unfortunately, since traditional anti-malware solutions may fail to monitor computing devices' GPUs, owners of the compromised devices may remain unaware of their devices' participation in the botnet.

As such, the instant disclosure identifies a need for systems and methods for monitoring computing devices' GPUs to determine whether they are executing malicious bots without the knowledge of the devices' owners.

SUMMARY

As will be described in greater detail below, the instant disclosure generally relates to systems and methods for determining whether GPUs are executing potentially malicious processes. In one example, a computer-implemented method for accomplishing such a task may include (1) identifying at least one GPU associated with a computing device, (2) analyzing the behavior of the GPU associated with the computing device, (3) determining that the analyzed behavior of the GPU indicates that the GPU is executing at least one potentially malicious process, and then (4) performing at least one security action on the GPU in response to determining that the analyzed behavior indicates that the GPU is executing the potentially malicious process.

In some examples, the method may also include identifying a computing load on the GPU, such as an amount of processing power currently being used by the GPU, an amount of electrical power currently being consumed by the GPU, and/or a temperature detected proximate to the GPU. In such examples, the method may further include determining that the computing load on the GPU indicates that the GPU is executing the potentially malicious process.

In some examples, the method may also include identifying a computing load on a CPU associated with the computing device and then comparing the computing load on the GPU with the computing load on the CPU. In such examples, the method may further include determining, based at least in part on this comparison, that the GPU is executing the potentially malicious process. For example, the method may include determining that the computing load on the GPU exceeds the computing load on the CPU by a predetermined amount.

In some examples, the method may also include identifying computer graphics generated by the GPU and then determining that the computing load on the GPU does not correspond to the computer graphics generated by the GPU. For example, the method may include determining that the computing load on the GPU is disproportionate to the computer graphics generated by the GPU.

In some examples, the method may also include identifying a process executed by the GPU. In one example, the method may further include comparing the process executed by the GPU with a list of known processes and then determining, based at least in part on this comparison, that the process represents an unknown process. In another example, the method may further include comparing the process executed by the GPU with a whitelist that identifies known non-malicious processes and then determining, based at least in part on this comparison, that the process does not match any of the known non-malicious processes identified in the whitelist. In an additional example, the method may further include comparing the process executed by the GPU with a blacklist that identifies known-malicious processes and then determining, based at least in part on this comparison, that the process matches at least one known-malicious process identified in the blacklist.

In some examples, the security action performed on the GPU may include (1) stopping the potentially malicious process from being executed by the GPU, (2) quarantining at least one file associated with the potentially malicious process, (3) deleting at least one file associated with the potentially malicious process, and/or (4) preventing communication with at least one other computing device associated with the potentially malicious process.

In one embodiment, a system for implementing the above-described method may include (1) an identification module programmed to identify at least one GPU associated with a computing device, (2) an analysis module programmed to (a) analyze the behavior of the GPU associated with the computing device and (b) determine that the analyzed behavior of the GPU indicates that the GPU is executing at least one potentially malicious process, and (3) a security module programmed to perform at least one security action on the GPU in response to determining that the analyzed behavior indicates that the GPU is executing the potentially malicious process.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one GPU associated with the computing device, (2) analyze the behavior of the GPU associated with the computing device, (3) determine that the analyzed behavior of the GPU indicates that the GPU is executing at least one potentially malicious process, and then (4) perform at least one security action on the GPU in response to the determination that the analyzed behavior indicates that the GPU is executing the potentially malicious process.

As will be explained in greater detail below, by monitoring and/or analyzing computing devices' GPUs, the systems and methods described herein may facilitate determining whether such GPUs are executing potentially malicious processes without the knowledge of the devices' owners or users. As such, these systems and methods may help strengthen the computing devices' security while also improving their efficiency and performance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
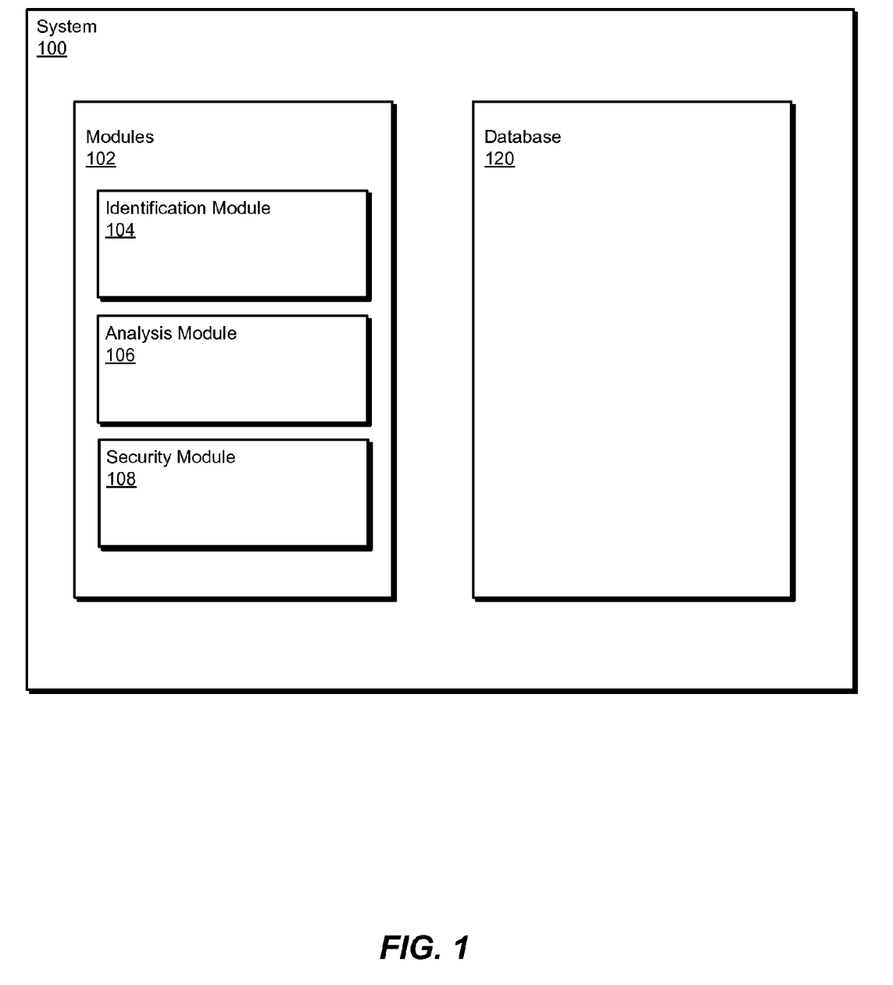
FIG. 1 is a block diagram of an exemplary system for determining whether GPUs are executing potentially malicious processes.
Figure 2:
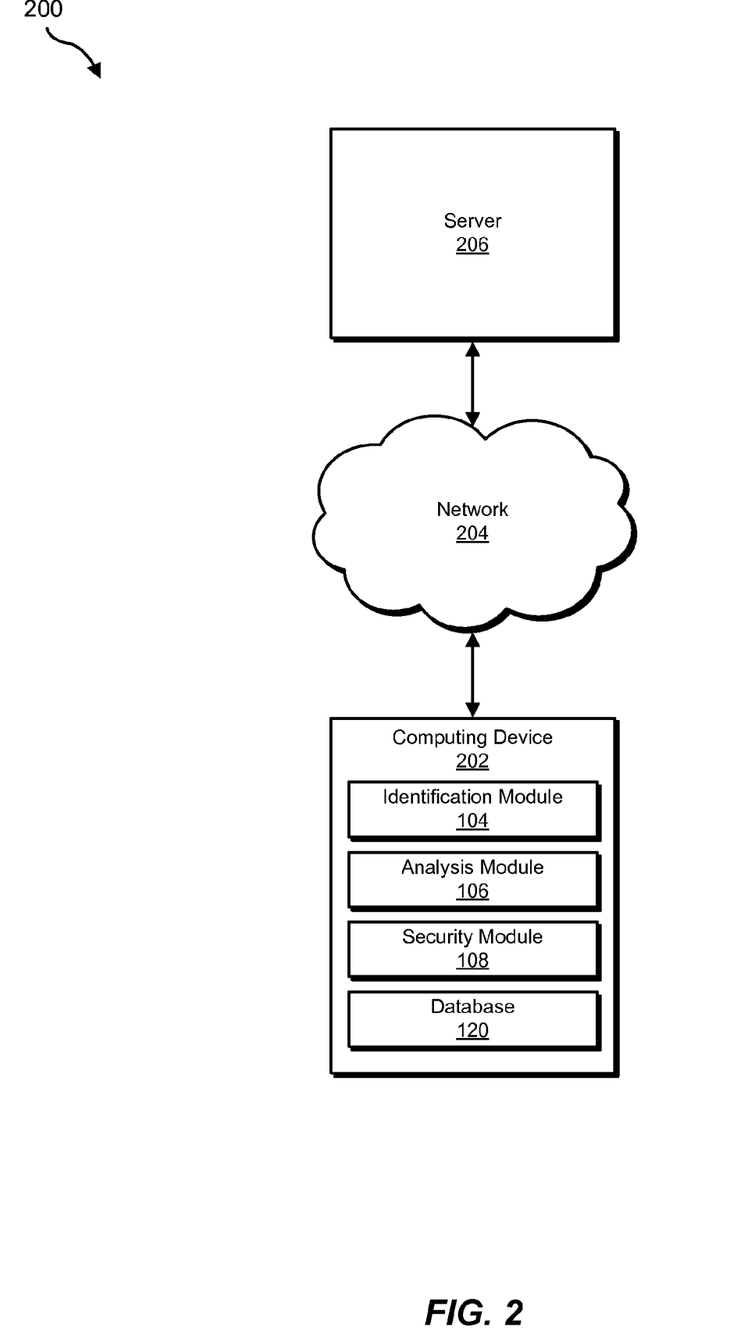
FIG. 2 is a block diagram of an exemplary system for determining whether GPUs are executing potentially malicious processes

The following will provide, with reference to FIGS. 1-2, detailed descriptions of exemplary systems for determining whether GPUs are executing potentially malicious processes. Detailed descriptions of corresponding computer-implemented methods will also be provided in connection with FIG. 3, and detailed descriptions of exemplary GPU information and exemplary CPU information will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for determining whether GPUs are executing potentially malicious processes. As illustrated in this figure, exemplary system 100 may include one or more modules 102 for performing one or more tasks. For example, and as will be explained in greater detail below, exemplary system 100 may include an identification module 104 programmed to identify at least one GPU associated with a computing device. Exemplary system 100 may also include an analysis module 106 programmed to (1) analyze the behavior of the GPU associated with the computing device and (2) determine that the analyzed behavior of the GPU indicates that the GPU is executing at least one potentially malicious process.

In addition, and as will be described in greater detail below, exemplary system 100 may include a security module 108 programmed to perform at least one security action on the GPU in response to the determination that the analyzed behavior indicates that the GPU is executing the potentially malicious process. Although illustrated as separate elements, one or more of modules 102 in FIG. 1 may represent portions of a single module or application (such as SYMANTEC'S NORTON ANTIVIRUS).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more lists (such as a list of known processes, a whitelist that identifies known non-malicious processes, and/or a blacklist that identifies known-malicious processes) capable of being used to determine whether GPUs are executing potentially malicious processes. In addition, database 120 may be configured to store information that identifies one or more thresholds (such as an amount that represents a suspicious level of difference between a computing load on a computing device's GPU and a computing load on the computing device's CPU) capable of being used to determine whether GPUs are executing potentially malicious processes. Database 120 may also be configured to store information about one or more of the computing device's components (such as the device's GPU and CPU) and/or information about the device's hardware, software, and/or firmware architectures.

Database 120 may represent portions of a single database or computing device or a plurality of databases or computing devices. For example, database 120 may represent a portion of computing device 202 and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 and/or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to determine whether GPUs are executing potentially malicious processes. For example, and as will be described in greater detail below, one or more of modules 102 may cause computing device 202 to (1) identify at least one GPU associated with computing device 202, (2) analyze the behavior of the GPU associated with computing device 202, (3) determine that the analyzed behavior of the GPU indicates that the GPU is executing at least one potentially malicious process, and then (4) perform at least one security action on the GPU in response to determining that the analyzed behavior indicates that the GPU is executing the potentially malicious process.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device capable of communicating and/or interfacing with at least one other computing device (such as computing device 202). For example, server 206 may provide and/or update information capable of being used by computing device 202 to determine whether at least one GPU associated with computing device 202 is executing at least one potentially malicious process. Examples of server 206 include, without limitation, application servers, web servers, and/or database servers configured to provide various web and/or database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
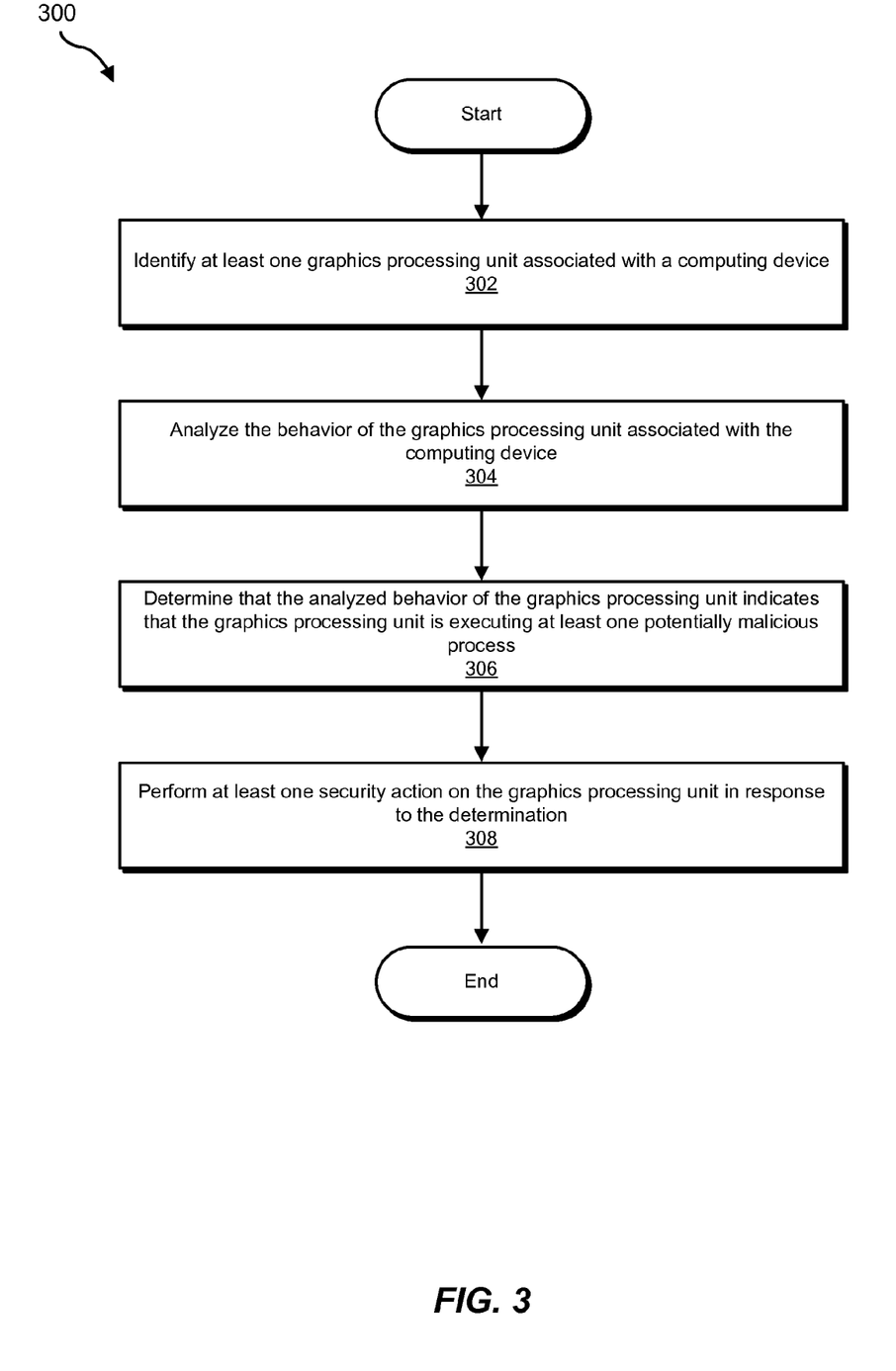
FIG. 3 is a flow diagram of an exemplary method for determining whether GPUs are executing potentially malicious processes.

FIG. 3 is a flow diagram of an exemplary computer-implemented method 300 for determining whether GPUs are executing potentially malicious processes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 the various systems described herein may identify at least one GPU associated with a computing device. For example, identification module 104 may, as part of computing device 202 in FIG. 2, identify a GPU associated with computing device 202.

The term "GPU," as used herein, may refer to any computing component capable of generating and/or manipulating images (also known as "computer graphics") intended for output to a display. In some examples, the term "GPU" may refer to a computing component that uses parallel computing to perform calculations relating to the generation and/or manipulation of such images.

In addition to generating and/or manipulating computer graphics, the GPU may be capable of performing at least some general-purpose computing operations (sometimes referred to as a "GPGPU"). Specifically, computing device 202 may direct the GPU to use parallel computing to perform various non-graphical calculations typically performed by a CPU. For example, the GPU may use parallel computing to model a weather forecast for a particular geographic region and/or perform a complex cryptographic operation on a block of data stored in memory.

In some examples, the GPU may represent a discrete computing component, such as a graphics card, within computing device 202. In other examples, the GPU may represent a portion of a larger component associated with computing device 202. For example, the GPU may be located on a motherboard integrated into computing device 202. The GPU may also be located on the same semiconductor die (e.g., within the same integrated circuit) as at least one CPU associated with computing device 202.

The systems described herein may perform step 302 in a variety of ways. In one example, identification module 104 may query an operating system installed on computing device 202 to obtain the GPU's device ID. In another example, identification module 104 may obtain the GPU's device ID from database 120, which may be populated by system or application software on computing device 202.

Returning to FIG. 3, at step 304 the various systems described herein may analyze the behavior of the GPU associated with the computing device. For example, analysis module 106 may, as part of computing device 202 in FIG. 2, analyze the behavior of the GPU associated with computing device 202.

The term "behavior," as used herein, may refer to any aspect of the GPU's overall activity, performance, and/or identity. Examples of indicators of the GPU's behavior include, without limitation, any combination of one or more of the GPU's characteristics, features, actions, patterns, outputs, performance statistics, computing loads, and/or any other suitable indicators of behavior.

The systems described herein may perform step 304 in a variety of ways. In some examples, analysis module 106 (or identification module 104) may identify a computing load on the GPU associated with computing device 202. Examples of this computing load include, without limitation, the amount of processing power currently being used by the GPU, the amount of electrical power currently being consumed by the GPU, a temperature detected proximate to the GPU, the amount of processes currently being executed by the GPU, and/or any other information that may be used to identify GPU computing loads.

Figure 4:
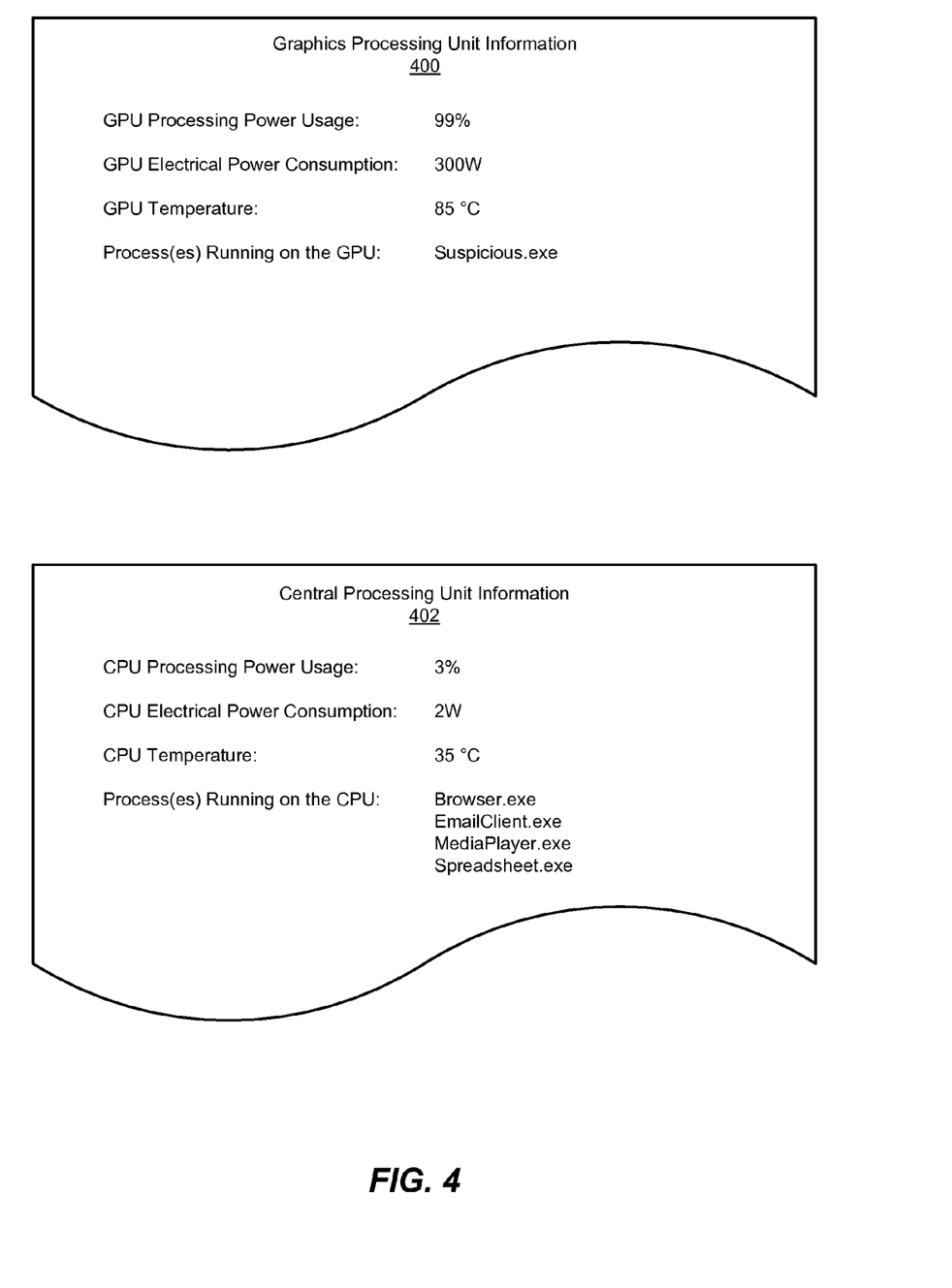
FIG. 4 is an illustration of exemplary GPU information and exemplary CPU information.

In some examples, analysis module 106 may identify the computing load on the GPU associated with computing device 202 by accessing and analyzing GPU information 400. As illustrated in FIG. 4, GPU information 400 may identify the amount of processing power currently being used by the GPU (in this example, "99%"), the amount of electrical power currently being consumed by the GPU (in this example, "300 W"), the temperature of the GPU (in this example, "85° C."), and the process(es) running on the GPU (in this example, "Suspicious.exe").

In one example, the operating system installed on computing device 202 may compile GPU information 400 by monitoring the GPU. For example, the operating system may access the GPU's hardware and identify its processing power usage, electrical power consumption, and/or temperature. In this example, the operating system may also identify at least one process running on the GPU by tracing back from a particular resource in use on computing device 202 to the process being executed by GPU. Upon identifying one or more of these characteristics of the process being executed by the GPU, the operating system may generate GPU information 400 and then store GPU information 400 in database 120 to be accessed by analysis module 106.

In another example, analysis module 106 may access and/or compile GPU information 400 by interfacing with third-party software that monitors the GPU (such as GPU-Z). For example, a user of computing device 202 may install GPU-monitoring software on computing device 202. In this example, analysis module 106 may initiate a request to access information about the GPU's processing power usage, electrical power consumption, and/or temperature from the GPU-monitoring software. The GPU-monitoring software may receive this request and enable analysis module 106 to access such information.

In an additional example, analysis module 106 may access and/or compile GPU information 400 by directly querying the GPU. For example, analysis module 106 may initiate a request to obtain information about the GPU's processing power usage, electrical power consumption, and/or temperature directly from the GPU. In this example, the GPU may receive the request and identify one or more of these characteristics. Upon identifying one or more of these characteristics, the GPU may generate information that identifies such characteristics and then send the information to analysis module 104.

In another example, analysis module 106 may analyze the behavior of the GPU by estimating the computing load on the GPU. For example, the GPU may not be equipped with a sensor capable of measuring the amount of electrical power being consumed by the GPU. In this example, the operating system or GPU-monitoring software may use the GPU's temperature to estimate the GPU's electrical power consumption. For example, the operating system or GPU-monitoring software may estimate the GPU's electrical power consumption by using a temperature-to-power conversion table or formula specific to the GPU associated with computing device 202. Analysis module 106 may then identify this estimation of the GPU's electrical power consumption while analyzing the GPU's behavior.

Returning to FIG. 3, at step 306 the various systems described herein may determine that the analyzed behavior of the GPU indicates that the GPU is executing a potentially malicious process. For example, analysis module 106 may, as part of computing device 202 in FIG. 2, determine that the analyzed behavior of the GPU indicates that the GPU is executing a potentially malicious process.

The phrase "potentially malicious process," as used herein, may refer to any executable process that has infiltrated (or is suspected of having infiltrated) a computing device without the informed consent of the device's owner or user. Examples of potentially malicious processes include, without limitation, unsolicited bots (such as BITCOIN-mining bots and/or password-cracking bots), malware, computer viruses, computer worms, Trojan horses, spyware, adware, any processes suspected of being one or more of the same, and/or any other potentially malicious processes.

The systems described herein may perform step 306 in a variety of ways. In one example, analysis module 106 may determine that a computing load on the GPU indicates that the GPU is executing a potentially malicious process. For example, analysis module 106 may determine that the computing load on the GPU does not correspond to (i.e., does not accurately reflect the amount and/or complexity of) computer graphics generated by the GPU, which may indicate that the GPU is executing a malicious process.

For example, analysis module 106 may identify a sequence of computer graphics generated by the GPU. Analysis module 106 may then analyze one or more characteristics of these computer graphics to determine whether the GPU's computing load corresponds to the amount and/or level of complexity of the computer graphics generated by the GPU. If the computing load on the GPU is disproportionate to the amount and/or level of complexity of the computer graphics generated by the GPU, analysis module 106 may determine that the GPU is potentially executing a malicious process.

For example, if analysis module 106 determines, by accessing GPU information 400, that the current computing load on the GPU is very high (e.g., if 99% of the processing power of the GPU is being consumed) even though the GPU is currently only generating simple static images (as opposed to, e.g., complex 3D images, such as might be associated with complex video games), then analysis module 106 may determine that this disproportionate load on the GPU is suspicious and potentially indicative of a malicious process controlling the GPU.

In another example of step 306, analysis module 106 may compare the computing load on the GPU with a computing load on a CPU associated with computing device 202. In this example, analysis module 106 may then determine, based at least in part on this comparison, that differences between these computing loads indicate that the GPU is executing one or more potentially malicious processes. For example, analysis module 106 may determine that the computing load on the GPU is suspicious if this load exceeds the CPU's computing load by more than a predetermined amount.

For example, analysis module 106 may determine, by accessing GPU and CPU information 400 and 402 in FIG. 4, that 99% of the GPU's processing power is being consumed (i.e., the GPU is running at a near-maximum level of operation), while only 3% of the CPU's processing power is being consumed (i.e., the CPU is nearly idle). In this example, analysis module 106 may determine that the GPU's processing power usage is suspicious since it exceeds the CPU's processing power usage by more than a predetermined amount (e.g., by more than 80%). As such, analysis module 106 may determine that this disproportionate load on the GPU indicates that the GPU is likely executing a potentially malicious process.

As with GPU computing loads, examples of CPU computing loads include, without limitation, the amount of processing power currently being used by the CPU, the amount of electrical power currently being consumed by the CPU, a temperature detected proximate to the CPU, the amount of processes currently being executed by the CPU, and/or any other information capable of identifying a computing load on a CPU. In one example, analysis module 106 may identify a CPU's computing load by accessing and analyzing CPU information 402. As illustrated in FIG. 4, CPU information 402 may identify the amount of processing power currently being used by the CPU (in this example, "3%"), the amount of electrical power currently being consumed by the CPU (in this example, "2W"), the temperature of the CPU (in this example, "35° C."), and the process(es) running on the CPU (in this example, "Browser.exe," "EmailClient.exe," "MediaPlayer.exe," and "Spreadsheet.exe"). CPU information 402 may be compiled in a variety of ways, including any of those described above (e.g., by the operating system installed on computing device 202, by third-party software that monitors the CPU (such as CPU-Z), and/or by analysis module 106 in connection with GPU information 400).

In some examples, upon determining that the GPU is likely executing a potentially malicious process, analysis module 106 may take one or more additional steps to verify whether the GPU is actually executing a malicious process. In one example, analysis module 106 may enumerate through the processes executing on the GPU to determine whether analysis module 106 has any additional information on (or knowledge of) such processes. For example, analysis module 106 may compare each process executing on the GPU with one or more lists used to determine whether or not the process is actually malicious. Such lists may include a list of known processes, a whitelist that identifies known non-malicious processes, and/or a blacklist that identifies known-malicious processes.

For example, analysis module 106 may identify the "Suspicious.exe" process executing on the GPU (as shown in GPU information 400). In this example, analysis module 106 may compare the "Suspicious.exe" process with a list of processes known to computing device 202. During this comparison, analysis module 106 may determine that the "Suspicious.exe" process does not match any of the known processes identified in the list. As such, analysis module 106 may determine that the unknown status of the "Suspicious.exe" process indicates that the process is likely malicious.

In another example, analysis module 106 may compare the "Suspicious.exe" process with a whitelist that identifies known non-malicious processes. During this comparison, analysis module 106 may determine that the "Suspicious.exe" process does not match any of the known non-malicious processes identified in the whitelist and, as such, that this the process is likely malicious.

In an additional example, analysis module 106 may compare the "Suspicious.exe" process with a blacklist that identifies known-malicious processes. During this comparison, analysis module 106 may determine that the "Suspicious.exe" process is identified in the blacklist as a known-malicious process. For example, analysis module 106 may determine, by consulting the blacklist, that the "Suspicious.exe" process running on the GPU represents a bot that uses the GPU to perform various BITCOIN mining operations. In this example, the "Suspicious.exe" process may represent part of a botnet configured to leverage the processing power of compromised computing devices (such as computing device 202) in an attempt to generate such BITCOINs. The "Suspicious.exe" process may have infiltrated computing device 202 and started running on the GPU without the knowledge or consent of the user of computing device 202.

In some examples, analysis module 106 may download one or more updates from server 206. For example, computing device 202 may periodically download updates from server 206 that are configured to modify the above-described lists of known processes, known non-malicious processes, and/or known-malicious processes. Analysis module 102 may also download updates from server 206 that are configured to modify the various heuristics, thresholds, and/or algorithms used to analyze and/or compare the computing loads on the GPU and/or CPU. For example, analysis module 102 may download updates from server 206 that modify the above-described predetermined amount or threshold (i.e., the amount that represents a suspicious level of difference between the GPU's computing load and the CPU's computing load).

Returning to FIG. 3, at step 308 the various systems described herein may perform at least one security action on the GPU in response to determining that the analyzed behavior of the GPU indicates that the GPU is executing the potentially malicious process. For example, security module 108 may, as part of computing device 202 in FIG. 2, perform a security action on the GPU associated with computing device 202. In this example, security module 108 may perform the security action in response to the determination that that the analyzed behavior of the GPU indicates that the GPU is executing the potentially malicious process.

The systems described herein may perform step 308 in a variety of ways. For example, security module 108 may stop the potentially malicious process from being executed by the GPU, quarantine at least one file associated with the potentially malicious process, and/or delete at least one file associated with the potentially malicious process.

In an additional example, security module 108 may prevent communication with at least one other computing device associated with the potentially malicious process. For example, security module 108 may prevent computing device 202 from sending calculations performed by the GPU to any other computing device (not illustrated in FIG. 2), such as other computing devices included in the same botnet as computing device 202. In this example, by preventing computing device 202 from sending such calculations, security module 108 may effectively undermine the contribution of computing device 202 to the botnet.

As explained above, by monitoring and/or analyzing computing devices' GPUs, the systems and methods described herein may facilitate determining whether such GPUs are executing potentially malicious processes without the knowledge of the devices' owners or users. As such, these systems and methods may help strengthen the computing devices' security while also improving their efficiency and performance.

Figure 5:
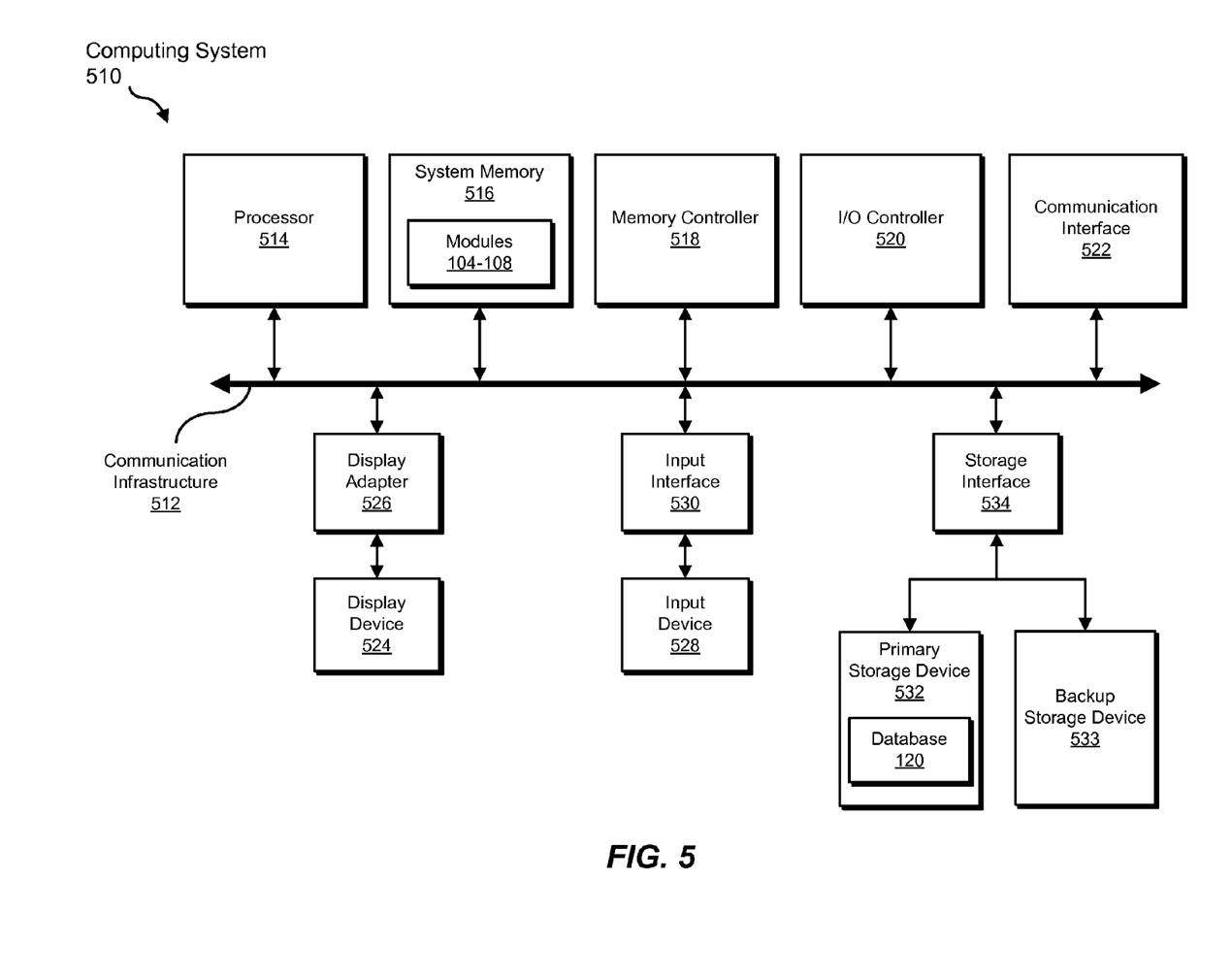
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, analyzing, determining, performing, comparing, stopping, quarantining, deleting, and preventing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
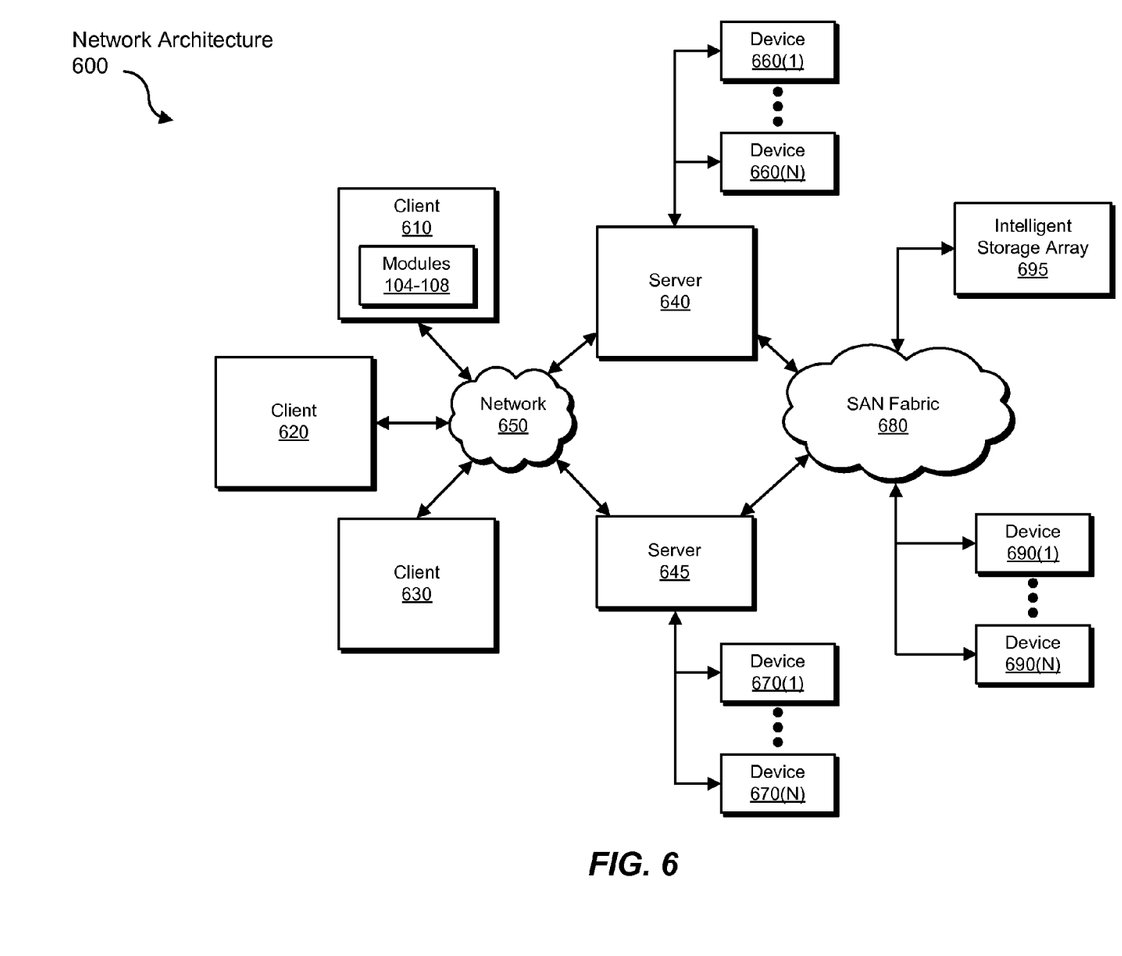
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, analyzing, determining, performing, comparing, stopping, quarantining, deleting, and preventing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. Error! Reference source not found, one or more storage devices Error! Reference source not found.60(1)-(N) may be directly attached to server Error! Reference source not found.40. Similarly, one or more storage devices Error! Reference source not found.70(1)-(N) may be directly attached to server Error! Reference source not found.45. Storage devices Error! Reference source not found.60(1)-(N) and storage devices Error! Reference source not found.70(1)-(N) generally represent any type or form of storage device or medium capable of storing data and/or other computer-readable instructions. In certain embodiments, storage devices Error! Reference source not found.60(1)-(N) and storage devices Error! Reference source not found.70(1)-(N) may represent network-attached storage (NAS) devices configured to communicate with servers Error! Reference source not found.40 and Error! Reference source not found.45 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for determining whether GPUs are executing potentially malicious processes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform the behavior of at least one GPU associated with computing device 202 by performing at least one security action on the GPU in response to determining that the GPU is executing at least one potentially malicious process.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining whether graphics processing units are executing potentially malicious processes, at least a portion of the method being performed by a computing device comprising at least one processor, the method comprising:
    identifying at least one graphics processing unit associated with the computing device;
    analyzing the behavior of the graphics processing unit associated with the computing device by identifying a computing load of the graphics processing unit;
    determining, based at least in part on the analysis of the behavior of the graphics processing unit, that the computing load on the graphics processing unit indicates that the graphics processing unit is executing malware by:
        identifying computer graphics generated by the graphics processing unit;
        determining that the computing load on the graphics processing unit is disproportionate to the computer graphics generated by the graphics processing unit;
        determining, based at least in part on the computing load on the graphics processing unit being disproportionate to the computer graphics generated by the graphics processing unit, that the computing load on the graphics processing unit does not correspond to the computer graphics generated by the graphics processing unit;
    performing at least one security action on the graphics processing unit in response to determining that the computing load on the graphics processing unit indicates that the graphics processing unit is executing the malware.

2. The method of claim 1, wherein determining that the computing load on the graphics processing unit indicates that the graphics processing unit is executing the malware comprises:
    identifying another computing load on a central processing unit associated with the computing device;
    comparing the computing load on the graphics processing unit with the other computing load on the central processing unit;
    determining, based at least in part on the comparison, that the graphics processing unit is executing the malware.

3. The method of claim 2, wherein determining that the graphics processing unit is executing the malware comprises determining that the computing load on the graphics processing unit exceeds the computing load on the central processing unit by a predetermined amount.

4. The method of claim 1, wherein identifying the computing load on the graphics processing unit comprises identifying at least one of:
    an amount of processing power currently being used by the graphics processing unit;
    an amount of electrical power currently being consumed by the graphics processing unit;
    a temperature detected proximate to the graphics processing unit.

5. The method of claim 1, wherein determining that the graphics processing unit is executing the malware comprises:
    identifying a process executed by the graphics processing unit;
    comparing the process executed by the graphics processing unit with a list of known processes;
    determining, based at least in part on the comparison, that the process represents malware.

6. The method of claim 1, wherein determining that the graphics processing unit is executing the malware comprises:
    identifying a process executed by the graphics processing unit;
    comparing the process executed by the graphics processing unit with a whitelist that identifies known non-malicious processes;
    determining, based at least in part on the comparison, that the process does not match any of the known non-malicious processes identified in the whitelist.

7. The method of claim 1, wherein determining that the graphics processing unit is executing the malware comprises:
    identifying a process executed by the graphics processing unit;
    comparing the process executed by the graphics processing unit with a blacklist that identifies known-malicious processes;
    determining, based at least in part on the comparison, that the process matches at least one known-malicious process identified in the blacklist.

8. The method of claim 1, wherein the malware comprises a bot that represents part of a botnet.

9. The method of claim 1, wherein the security action comprises at least one of:
    stopping the malware from being executed by the graphics processing unit;
    quarantining at least one file associated with the malware;
    deleting at least one file associated with the malware;
    preventing communication with at least one other computing device associated with the malware.

10. A system for determining whether graphics processing units are executing potentially malicious processes, the system comprising:
    an identification module, stored in memory, that identifies at least one graphics processing unit associated with a computing device;
    an analysis module, stored in memory, that:
        analyzes the behavior of the graphics processing unit associated with the computing device by identifying a computing load of the graphics processing unit; determines, based at least in part on the analysis of the behavior of the graphics processing unit, that the computing load of the graphics processing unit indicates that the graphics processing unit is executing malware by:
  identifying computer graphics generated by the graphics processing unit;
  determining that the computing load on the graphics processing unit is disproportionate to the computer graphics generated by the graphics processing unit;
  determining, based at least in part on the computing load on the graphics processing unit being disproportionate to the computer graphics generated by the graphics processing unit, that the computing load on the graphics processing unit does not correspond to the computer graphics generated by the graphics processing unit;
a security module, stored in memory, that performs at least one security action on the graphics processing unit in response to the determination that the computing load of the graphics processing unit indicates that the graphics processing unit is executing the malware;
at least one processor configured to execute the identification module, the analysis module, and the security module.

11. The system of claim 10, wherein the analysis module further:
  identifies another computing load on a central processing unit associated with the computing device;
  compares the computing load on the graphics processing unit with the other computing load on the central processing unit;
  determines, based at least in part on the comparison, that the graphics processing unit is executing the malware.

12. The system of claim 11, wherein the analysis module further determines that the computing load on the graphics processing unit exceeds the computing load on the central processing unit by a predetermined amount.

13. The system of claim 10, wherein the analysis module further:
  identifies a process executed by the graphics processing unit;
  compares the process executed by the graphics processing unit with at least one of:
    a list of known processes;
    a whitelist that identifies known non-malicious processes;
    a blacklist that identifies known-malicious processes;
  determines, based at least in part on the comparison, at least one of:
    that the process represents malware;
    that the process does not match any of the known non-malicious processes identified in the whitelist;
    that the process matches at least one known-malicious process identified in the blacklist.

14. A non-transitory computer-readable-storage medium comprising one or more computer-executable instructions that, when executed by at least one processor of a computing device, cause the computing device to:
  identify at least one graphics processing unit associated with the computing device;
  analyze the behavior of the graphics processing unit associated with the computing device by identifying a computing load of the graphics processing unit;
  determine, based at least in part on the analysis of the behavior of the graphics processing unit, that the computing load of the graphics processing unit indicates that the graphics processing unit is executing malware by:
    identifying computer graphics generated by the graphics processing unit;
    determining that the computing load on the graphics processing unit is disproportionate to the computer graphics generated by the graphics processing unit;
    determining, based at least in part on the computing load on the graphics processing unit being disproportionate to the computer graphics generated by the graphics processing unit, that the computing load on the graphics processing unit does not correspond to the computer graphics generated by the graphics processing unit;
  perform at least one security action on the graphics processing unit in response to determining that the computing load of the graphics processing unit indicates that the graphics processing unit is executing the malware.

* * * * *

UNITED STATES PATENT AND TRADEMARK OFFICE
CERTIFICATE OF CORRECTION

| | |
|---|---|
| PATENT NO. | : 9,104,873 B1 |
| APPLICATION NO. | : 13/476508 |
| DATED | : August 11, 2015 |
| INVENTOR(S) | : Joseph Chen and Brendon Woirhaye |

It is certified that error appears in the above-identified patent and that said Letters Patent is hereby corrected as shown below:

In the Claims

Claim 10, at column 16, lines 65 to 67, and at column 17, lines 1 to 5, should read:

analyzes the behavior of the graphics processing unit associated with the computing device by identifying a computing load of the graphics processing unit;
determines, based at least in part on the analysis of the behavior of the graphics processing unit, that the computing load of the graphics processing unit indicates that the graphics processing unit is executing malware by:

Signed and Sealed this
Twenty-eighth Day of June, 2016

Michelle K. Lee
*Director of the United States Patent and Trademark Office*